United States Patent
Ogawa et al.

(10) Patent No.: US 11,988,162 B2
(45) Date of Patent: May 21, 2024

(54) ENGINE INTAKE SYSTEM CONTROL DEVICE AND CONTROL METHOD THEREOF

(71) Applicant: Transtron Inc., Yokohama (JP)

(72) Inventors: Masatoshi Ogawa, Yokohama (JP); Takuma Degawa, Yokohama (JP)

(73) Assignee: TRANSTRON INC., Yokohama (JP)

( * ) Notice: Subject to any disclaimer, the term of this patent is extended or adjusted under 35 U.S.C. 154(b) by 135 days.

(21) Appl. No.: 16/928,336

(22) Filed: Jul. 14, 2020

(65) Prior Publication Data

US 2021/0017921 A1      Jan. 21, 2021

(30) Foreign Application Priority Data

Jul. 17, 2019   (JP) .................................. 2019-132090

(51) Int. Cl.
*F02D 41/00*     (2006.01)
*F02B 37/16*     (2006.01)
(Continued)

(52) U.S. Cl.
CPC ........ *F02D 41/0007* (2013.01); *F02B 37/162* (2019.05); *F02B 37/24* (2013.01); *F02D 41/1401* (2013.01); *F02D 41/18* (2013.01); *F02D 41/2451* (2013.01); *F02D 2041/1409* (2013.01); *F02D 2041/1422* (2013.01); *F02D 2041/1423* (2013.01); *F02D 2200/0602* (2013.01); *F02D 2200/101* (2013.01)

(58) Field of Classification Search
CPC ......... F02D 2200/0406; F02D 41/0007; F02D 41/0072; F02D 41/18; F02D 41/2451; F02B 37/162; F02B 37/24
See application file for complete search history.

(56) References Cited

U.S. PATENT DOCUMENTS 6,128,902 A      10/2000   Kolmanovsky et al.
7,792,631 B2 *   9/2010    Bottcher ................ F02M 26/47
                                                        701/108
(Continued)

FOREIGN PATENT DOCUMENTS

EP        1930576 A2      6/2008
JP    2005-320937 A      11/2005
(Continued)

OTHER PUBLICATIONS

Yang et al., "Three-Input-Three-Output Air Path Control System of a Heavy-Duty Diesel Engine", 8th IFAC International Symposium on Advances in Automotive Control, 2016, pp. 616-622, cited in Specification (7 pages).

(Continued)

*Primary Examiner* — Gonzalo Laguarda
(74) *Attorney, Agent, or Firm* — WHDA, LLP

(57) ABSTRACT

An engine intake system control device configured to control an intake system of an engine, having a map function that inputs at least a fuel injection pressure of the engine, a fresh air flow, and a compressor outlet temperature of a supercharger, and outputs a control gain; and a control unit that inputs the control gain and a deviation between a controlled variable of the intake system of the engine and a target value thereof, and controls a manipulated variable of the intake system of the engine.

13 Claims, 12 Drawing Sheets

F_INJ_P: FUEL INJECTION PRESSURE
NAF_Q: FRESH AIR FLOW
SPC_Tout: COMPRESSOR OUTLET TEMPERATURE
TRB_B_u: TURBINE VANE OPENING DEGREE (MANIPULATED VARIABLE)
SPC_P_y: SUPERCHARGING PRESSURE (CONTROLLED VARIABLE)
SPC_P_r: TARGET SUPERCHARGING PRESSURE

(51) Int. Cl.
*F02B 37/24* (2006.01)
*F02D 41/14* (2006.01)
*F02D 41/18* (2006.01)
*F02D 41/24* (2006.01)

(56) References Cited

U.S. PATENT DOCUMENTS

| | | | | |
|---|---|---|---|---|
| 8,116,967 | B2 * | 2/2012 | Bottcher | F02D 41/1462 |
| | | | | 701/115 |
| 8,297,047 | B2 * | 10/2012 | Yasui | F01N 13/009 |
| | | | | 60/301 |
| 9,512,790 | B2 * | 12/2016 | Nagar | F01B 7/14 |
| 9,599,040 | B2 * | 3/2017 | Sivasubramanian | |
| | | | | F02D 19/0607 |
| 9,765,621 | B2 * | 9/2017 | Huang | F02D 41/0007 |
| 10,273,874 | B2 * | 4/2019 | Santillo | F02D 41/26 |
| 10,605,155 | B2 * | 3/2020 | Zeng | F02M 26/06 |
| 2009/0090107 | A1 | 4/2009 | Youssef et al. | |
| 2011/0029220 | A1 | 2/2011 | Sasaki et al. | |
| 2017/0114748 | A1 * | 4/2017 | Roth | F02B 1/14 |

FOREIGN PATENT DOCUMENTS

| | | |
|---|---|---|
| JP | 2006-105098 A | 4/2006 |
| JP | 2008-144655 A | 6/2008 |
| JP | 2010-249057 A | 11/2010 |
| JP | 2011-32913 A | 2/2011 |
| JP | 2013-19306 A | 1/2013 |

OTHER PUBLICATIONS

Extended Search Report dated Nov. 24, 2020, issued in counterpart EP Application No. 20185929.5 (9 pages).
Office Action dated Apr. 24, 2023, issued in counterpart EP Application No. 20185929.5 (5 pages).
Office Action dated Jun. 13, 2023, issued in counterpart JP Patent Application No. 2019-132090 with English translation (5 pages).

* cited by examiner

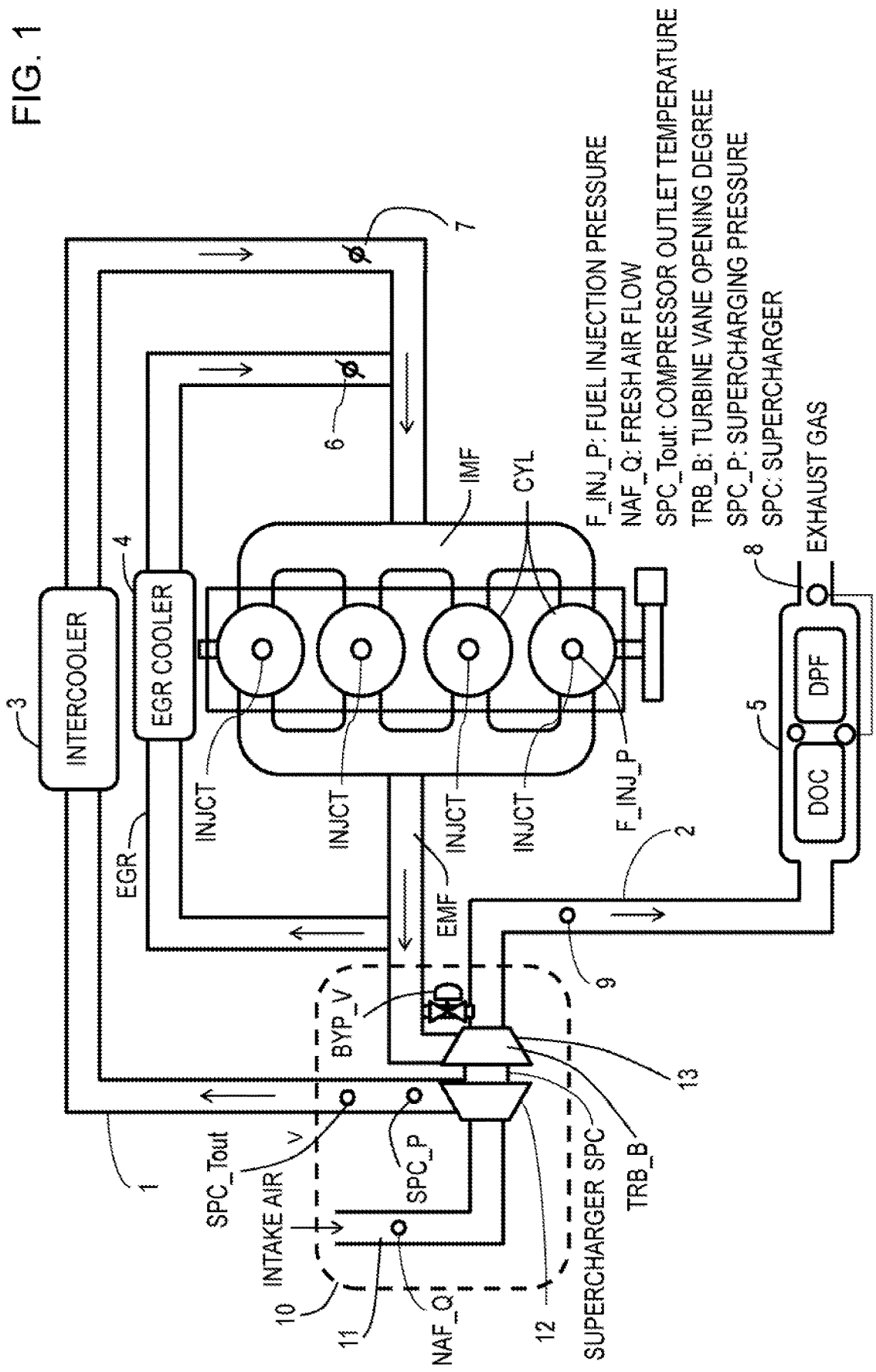

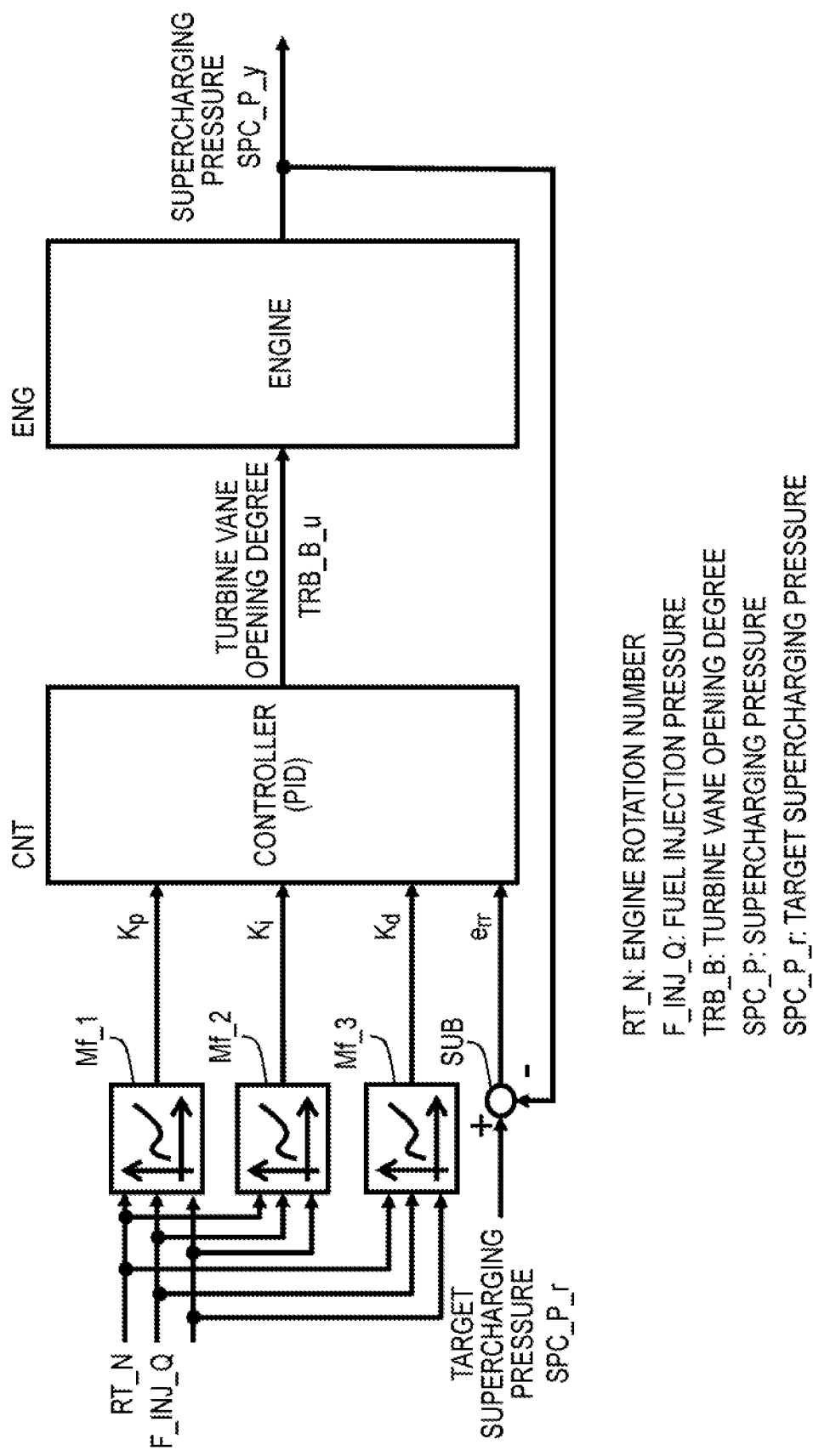

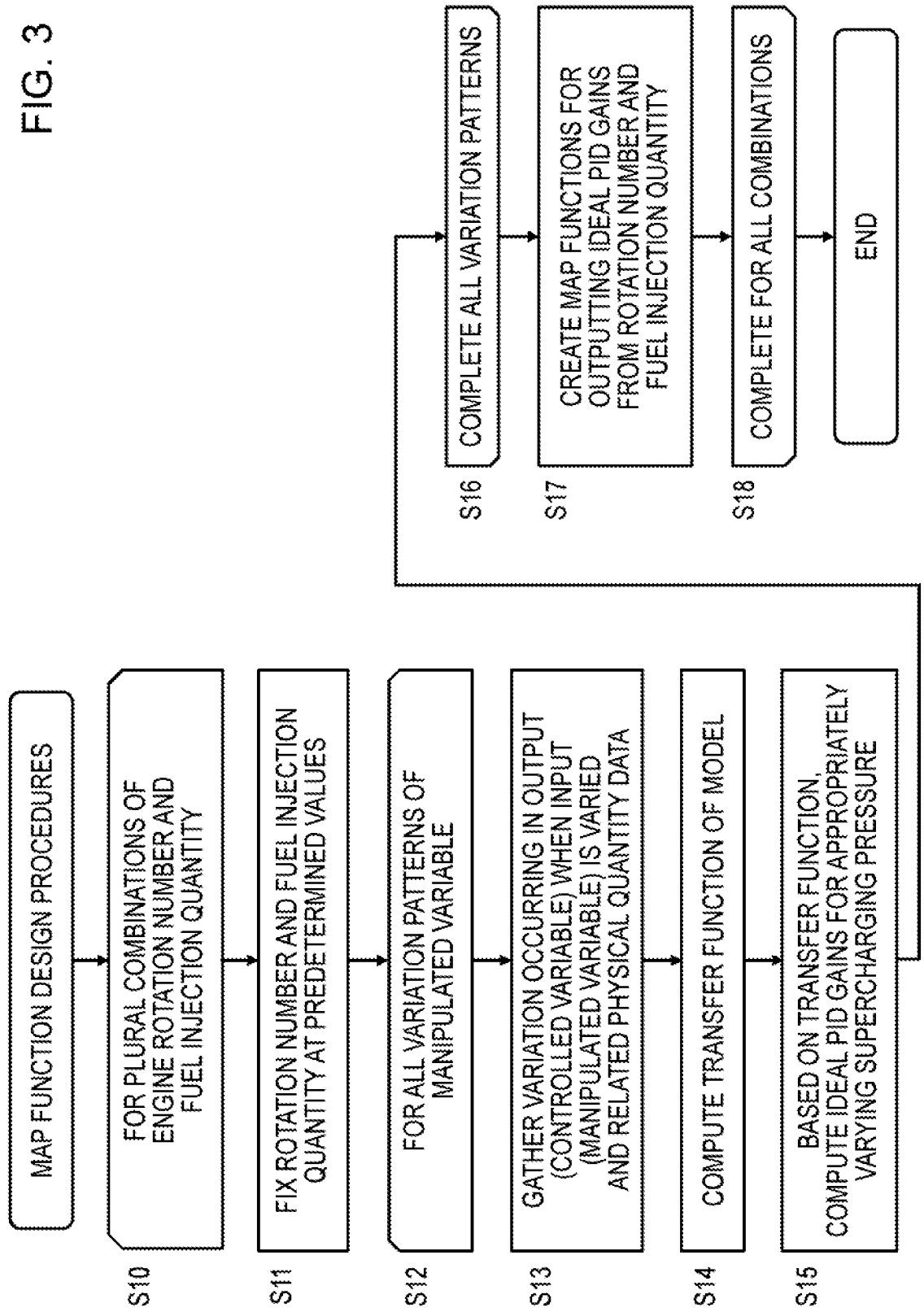

FIG. 4

| | MANIPULATED VARIABLE TURBINE VANE OPENING DEGREE TRB_B_u | | ROTATION NUMBER RT_N | FUEL INJECTION PRESSURE F_INJ_Q | PRE-VARIATION FRESH AIR FLOW NAF_Q | PRE-VARIATION COMPRESSOR OUTLET TEMPERATURE SPC_Tout | PRE-VARIATION INJECTION PRESSURE F_INJ_P | IDEAL PID GAINS | | |
|---|---|---|---|---|---|---|---|---|---|---|
| | PRE-VARIATION ⇒ | POST-VARIATION | | | | | | Kp | Ki | Kd |
| No.1 | 10 | 40 | 1500 | 40 | M_af1 | T_comp1 | R_p1 | Kp1 | Ki1 | Kd1 |
| No.2 | 40 | 10 | 1500 | 40 | M_af2 | T_comp2 | R_p2 | Kp2 | Ki2 | Kd2 |
| No.3 | 20 | 60 | 1500 | 40 | M_af3 | T_comp3 | R_p3 | Kp3 | Ki3 | Kd3 |
| No.4 | 60 | 20 | 1500 | 40 | M_af4 | T_comp4 | R_p4 | Kp4 | Ki4 | Kd4 |
| No.5 | 50 | 80 | 1500 | 40 | M_af5 | T_comp5 | R_p5 | Kp5 | Ki5 | Kd5 |
| No.6 | 80 | 50 | 1500 | 40 | M_af6 | T_comp6 | R_p6 | Kp6 | Ki6 | Kd6 |
| No.7 | 10 | 40 | 2500 | 50 | M_af7 | T_comp7 | R_p7 | Kp7 | Ki7 | Kd7 |
| No.8 | 40 | 10 | 2500 | 50 | M_af8 | T_comp8 | R_p8 | Kp8 | Ki8 | Kd8 |
| No.9 | 20 | 60 | 2500 | 50 | M_af9 | T_comp9 | R_p9 | Kp9 | Ki9 | Kd9 |
| No.10 | 60 | 20 | 2500 | 50 | M_af10 | T_comp10 | Rp10 | Kp10 | Ki10 | Kd10 |
| No.11 | 50 | 80 | 2500 | 50 | M_af11 | T_comp11 | Rp11 | Kp11 | Ki11 | Kd11 |
| No.12 | 80 | 50 | 2500 | 50 | M_af12 | T_comp12 | Rp12 | Kp12 | Ki12 | Kd12 |
| ⋮ | ⋮ | ⋮ | ⋮ | ⋮ | ⋮ | ⋮ | ⋮ | ⋮ | ⋮ | ⋮ |

FIG. 10

| | REPRODUCIBILITY RP1 OF PROPORTIONAL GAIN | REPRODUCIBILITY RP2 OF INTEGRAL GAIN | SUM OF REPRODUCIBILITY VALUES RP1, RP2 |
|---|---|---|---|
| CONTROL DEVICE OF FIG. 2 | 0.50 | 0.66 | 1.16 |
| CONTROL DEVICE OF FIG. 6 | 0.67 | 0.79 | 1.46 |

ENGINE INTAKE SYSTEM CONTROL DEVICE AND CONTROL METHOD THEREOF

CROSS-REFERENCE TO RELATED APPLICATION

This application is based upon and claims the benefit of priority of the prior Japanese Patent Application No. 2019-132090, filed on Jul. 17, 2019, the entire contents of which are incorporated herein by reference.

FIELD

The present invention relates to an engine intake system control device and a control method thereof.

BACKGROUND

An engine is used in a gasoline engine or a diesel engine of an automobile. In the field of engine control, an engine system that is a control subject exhibits strong nonlinearity, meaning that normal linear control such as proportional-integral-differential control (PID control) is not able to provide an appropriate control.

Therefore, gain scheduling control, in which the optimum control corresponding to the status of the control subject is performed, is often employed. Gain scheduling control is also known as variable-parameter PID control since the PID gains that are the parameters of the PID control are modified according to the status of the control subject. In the gain scheduling control, since the control parameters are modified in accordance with the status of the control subject, it is important to select factors to be used to determine the status of the control subject. The values of the control parameters normally generate a map function in response to input factors.

In engine control, factors such as the engine rotation number and the fuel injection quantity, i.e. engine operating conditions, are used as factors for determining the status of the control subject. This is illustrated in FIG. 12 of Z. Yang, E. Winward, D. Zhao, R. Stobart: Three-Input-Three-Output Air Path Control System of a Heavy-Duty Diesel Engine, Proc. of 8th IFAC International Symposium on Advances in Automotive Control. pp. 616-622. (2016)., for example.

The followings are prior arts of the engine intake system control device.
Patent Literature 1: Japanese Laid-open Patent Publication No. 2011-32913
Patent Literature 2: Japanese Laid-open Patent Publication No. 2010-249057
Patent Literature 3: Japanese Laid-open Patent Publication No. 2008-144655
Patent Literature 4: Japanese Laid-open Patent Publication No. 2006-105098
Non Patent Literature 1: Z. Yang, E. Winward, D. Zhao, R. Stobart: Three-Input-Three-Output Air Path Control System of a Heavy-Duty Diesel Engine, Proc. of 8th IFAC International Symposium on Advances in Automotive Control. pp. 616-622. (2016).

SUMMARY

However, with gain scheduling control in which PID control parameters (PID gains, control gains) are generated by map functions using the engine rotation number, the fuel injection quantity, and so on as factors, it is impossible to generate optimum PID gains corresponding to a plurality of statuses.

In the case of an engine intake system control device, when the engine intake system shifts to a different status with the engine rotation number and the fuel injection quantity set at fixed values, PID gains are required for each of the plurality of statuses. However, map functions that use the engine rotation number and the fuel injection quantity as factors are not able to generate PID gains for a plurality of statuses in this manner.

According to the aspect of the embodiment, an engine intake system control device configured to control an intake system of an engine, has a map function that inputs at least a fuel injection pressure of the engine, a fresh air flow, and a compressor outlet temperature of a supercharger, and outputs a control gain; and a control unit that inputs the control gain and a deviation between a controlled variable of the intake system of the engine and a target value of the intake system, and controls a manipulated variable of the intake system of the engine.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a view illustrating an example configuration of an engine that is a control subject of a control device according to this embodiment.

FIG. 2 is a view illustrating an example configuration of an engine intake system control device having map functions for computing PID gains on the basis of an engine rotation number RT_N and a fuel injection quantity F_INJ_Q.

FIG. 3 is a view depicting a flowchart of procedures for designing map functions.

FIG. 4 is a view illustrating examples of ideal PID gains for six variation patterns of the manipulated variable with respect to each of two combinations of the engine rotation number and the fuel injection quantity, determined by the present inventors through experiment.

FIG. 10 is a view illustrating comparison results of the reproducibility of the PID gains output by the map functions of the engine intake system control devices illustrated respectively in FIGS. 2 and 6.

DESCRIPTION OF EMBODIMENTS

Figure 5:
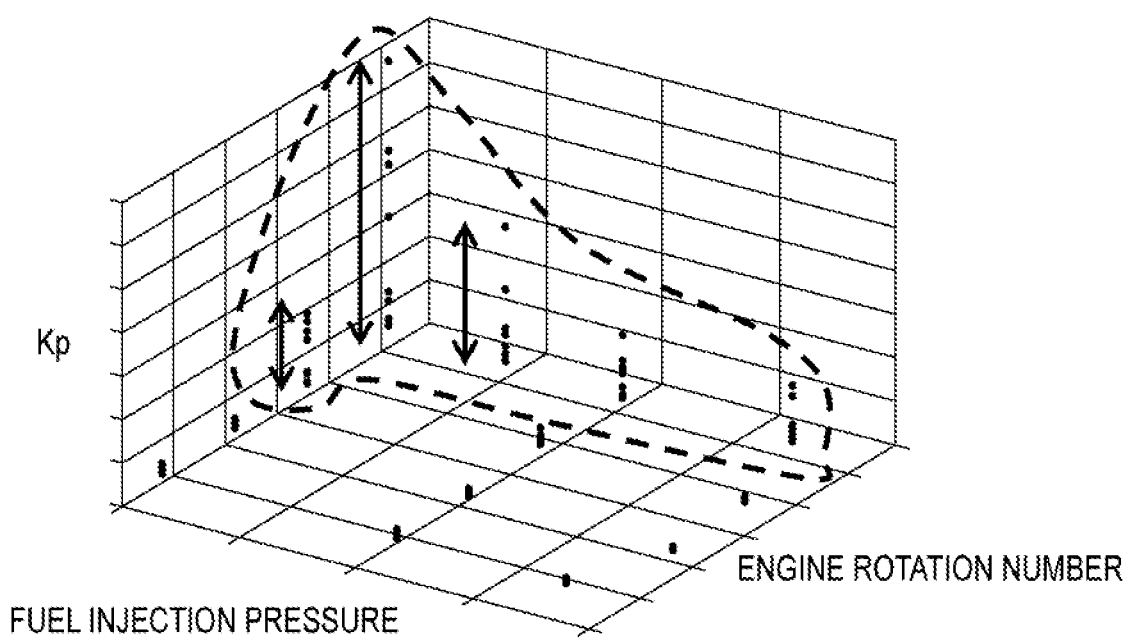
FIG. 5 is a view illustrating the map function Mf_p when designed on the basis of the experiment illustrated in FIG. 4.

FIG. 1 is a view illustrating an example configuration of an engine that is a control subject of a control device according to this embodiment. The engine illustrated in FIG. 1 is a gasoline engine or a diesel engine used in an automobile, for example. The engine includes four cylinders CYL for an internal combustion engine, injectors INJCT attached to the cylinders, an intake manifold IMF for supplying air to the cylinders, and an exhaust manifold EMF for outputting exhaust gas from the cylinders. The injectors INJCT of the cylinders inject fuel into the cylinders, and may be provided with a sensor for measuring a fuel injection pressure INJ_P.

The engine further includes an intake port 11 that suctions air from the outside, a supercharger SPC that compresses a flow of fresh air taken in thereby using the exhaust gas from the exhaust manifold EMF, an air supply passage 1 for supplying the air compressed by the supercharger to the intake manifold IMF, an intercooler 3 provided in the air supply passage 1, and a throttle valve 7 for controlling the quantity of air supplied to the IMF. The engine also includes an exhaust gas recirculation (EGR) device provided between the EMF and the IMF, and the EGR device is provided with an EGR cooler 4 for reducing the temperature of the exhaust gas and an EGR valve 6 for adjusting the quantity of recirculated exhaust gas.

The supercharger SPC is provided in an intake system 10 of the engine. The supercharger SPC includes a turbine 13 that is rotated by the exhaust gas, a compressor 12 that is rotated by the rotation of the turbine so as to compress the fresh air flow, and a turbine bypass valve BYP_V provided between the exhaust manifold EMF and an exhaust passage 2. Further, a turbine vane TRB_B having an adjustable opening degree is provided in the turbine 13. A turbine in which the turbine vane opening degree is controlled variably is known as a variable nozzle turbine. A sensor for measuring a fresh air flow NAF_Q, a sensor for measuring a supercharging pressure SPC_P, and a sensor for measuring an outlet temperature SPC_Tout of the compressor 12 of the supercharger SPC are provided in the intake system 10.

An excess air ratio detector 9 is provided in the exhaust passage 2, and an exhaust gas after treatment device 5 is provided between the exhaust passage 2 and an exhaust port 8.

The opening degree of the turbine vane (the turbine vane opening degree) TRB_B and the opening degree of the bypass valve (the bypass valve opening degree) BYP_V are used as actuators of the supercharger SPC of the intake system 10. Further, the opening degree of the EGR valve 6 controls the quantity of exhaust gas used to rotate the turbine and therefore also serves as an actuator.

FIG. 2 is a view illustrating an example configuration of an engine intake system control device having map functions for computing PID gains on the basis of an engine rotation number RT_N and a fuel injection quantity F_INJ_Q. The engine intake system control device of FIG. 2 includes map functions MF_1, MF_2, MF_3 that respectively inputs the engine rotation number RT_N, the fuel injection quantity F_INJ_Q, and another factor, and output PID gains $K_p$, $K_i$, $K_d$.

The engine intake system control device further includes a supercharger controller CNT that inputs a deviation err between a supercharging pressure SPC_R_y, which is the controlled variable of the intake system of the engine, and a target value SPC_P_r thereof and the PID gains $K_p$, $K_i$, $K_d$, which are control gains output by the map functions, and controls the turbine vane opening degree TRB_B_u. The supercharger controller CNT is a PID controller, for example, that computes the turbine vane opening degree TRB_B_u, which is a manipulated variable, with respect to the deviation err on the basis of the PID gains $K_p$, $K_i$, $K_d$. The turbine vane opening degree TRB_B_u is one of the manipulated variables of the intake system of the engine.

The engine intake system control device includes the map functions MF_1, MF_2, MF_3 and the supercharger controller CNT, as described above, and a subtractor SUB for determining a difference between the supercharging pressure SPC_P_y and the target value SPC_P_r thereof. The engine intake system control device controls the turbine vane opening degree, which is one of the manipulated variables of the supercharger of the engine ENG, in response to variation in the target value of the supercharging pressure SPC_P_r. The map functions MF_1, MF_2, MF_3 compute the PID gains $K_p$, $K_i$, $K_d$ of the PID controller CNT in response to input of the engine rotation number RT_N, the fuel injection quantity F_INJ_Q, and the other factor, i.e. parameters indicating the status of the engine. The controller CNT of the engine intake system control device then variably controls the turbine vane opening degree TRB_B_u that is a manipulated variable on the basis of the PID gains and the deviation $e_{rr}$ between the target value of the controlled variable and a measured value of the controlled variable of the engine.

When, as illustrated in FIG. 2, the map functions MF_1, MF_2, MF_3 respectively inputs the engine rotation number RT_N, the fuel injection quantity F_INJ_Q, and another factor, and output the PID gains $K_p$, $K_i$, $K_d$, the PID gains output by the map functions may not match ideal PID gains corresponding to different control statuses. The reason for this is as follows.

FIG. 3 is a view depicting a flowchart of procedures for designing map functions. The three map functions MF_1, MF_2, MF_3 are tables on which the PID gains $K_p$, $K_i$, $K_d$ are respectively given in relation to a plurality of combinations of the engine rotation number RT_N, the fuel injection quantity F_INJ_Q, and the other factor. Accordingly, the process for designing the map functions includes processing steps S11 to S17 executed in relation to a plurality of combinations (S10, S18) of the engine rotation number RT_N, the fuel injection quantity F_INJ_Q, and the other factor that are the inputs of the map functions.

First, an actual engine is operated and the engine rotation number RT_N, the fuel injection quantity F_INJ_Q, and the other factor are fixed at one of a plurality of combinations (S11). In this state, variation occurring in the controlled variable (the supercharging pressure SPC_P_y) in response to variation in the manipulated variable (the turbine vane opening degree TRB_B_u) is recorded, and a transfer function of the intake system of the engine, which is the controlled device, is computed. A variation pattern of the manipulated variable is a variation pattern in which the turbine vane opening degree is varied from a certain value to a different value. More specifically, when designing the map functions, processing steps S13 to S15 are executed on a plurality of variation patterns (S12, S16) of the manipulated variable.

In other words, variation occurring in the controlled variable that is the output of the controlled device (the intake system of the engine) when the manipulated variable that is the input is varied according to a predetermined variation pattern is recorded (S13). At this time, related physical quantity data may also be gathered.

Next, the transfer function of the intake system of the engine, i.e. the model, is computed based on the variation pattern of the manipulated variable (the turbine vane opening degree TRB_B_u) and variation in the controlled variable (the supercharging pressure SPC_P_y) (S14). The transfer function includes a time constant T, a gain K, a time lag L, and so on. On the basis of the computed transfer function of the model, the ideal PID gains $K_p$, $K_i$, $K_d$ with which to vary the supercharging pressure SPC_P_y that is the controlled variable appropriately to the target value of the supercharging pressure SPC_P_r are computed (S15). The ideal PID gains are control parameter values for varying the manipulated variable so that the controlled variable approaches the target value of the controlled variable without overshooting and without excessive delay during evaluation in a control simulation executed on paper, for example, by employing the transfer function as a virtual control subject and connecting the transfer function to a PID control-based controller. The processing steps S13 to S15 described above are performed for all variation patterns of the manipulated variable.

Next, map functions Mf_p, Mf_i, Mf_k for respectively outputting the ideal PID gains computed from the engine rotation number RT_N and the fuel injection quantity F_INJ_Q are created (S17). The processing steps S11 to S17 described above are executed for all combinations of the engine rotation number and the fuel injection quantity (S18).

The engine rotation number and the fuel injection quantity are commonly considered to be physical quantities from which to ascertain the status of the engine. Hence, the engine rotation number and the fuel injection quantity are used as the inputs (factors) of the map functions for outputting the optimum PID gains in accordance with the status of the engine illustrated in FIG. 2.

However, when the engine rotation number and the fuel injection quantity are set as the inputs (factors) of the map functions, as illustrated in FIG. 2, the map functions cannot output ideal PID gains corresponding to the status of the intake system of the engine. The reason for this is that when the engine rotation number and the fuel injection quantity are fixed at predetermined values during the map function design process described above, different ideal PID gains are computed for each of the plurality of variation patterns of the manipulated variable (the turbine vane opening degree). As a result, the map functions cannot output a plurality of ideal PID gains corresponding to a plurality of variation patterns of the manipulated variable in relation to an engine rotation number and a fuel injection quantity set at certain predetermined values. In conventional map function design, the map functions are designed so as to output average values or the like of a plurality of ideal PID gains in response to the input of predetermined values of the engine rotation number and the fuel injection quantity. Therefore, the designed map functions cannot output ideal PID gains for each of a plurality of statuses of the engine intake system that is the control subject.

FIG. 4 is a view illustrating examples of ideal PID gains for six variation patterns of the manipulated variable with respect to each of two combinations of the engine rotation number and the fuel injection quantity, determined by the present inventors through experiment.

In the case of a first combination in which the engine rotation number RT_N and the fuel injection quantity F_INJ_Q are 1500 rpm and 40 mm$^3$/st, respectively, different ideal PID gains $K_p$, $K_i$, $K_d$ are computed for each of the six variation patterns, i.e. pattern Nos. 1 to 6, of the manipulated variable (the turbine vane opening degree TRB_B_u). In other words, in pattern Nos. 1 to 6, six sets of ideal PID gains Kp1, Ki1, Kd1 to Kp6, Ki6, Kd6 exist in relation to the first combination of the engine rotation number and the fuel injection quantity.

Likewise in the case of a second combination in which the engine rotation number RT_N and the fuel injection quantity F_INJ_Q are 2500 rpm and 50 cc, respectively, different ideal PID gains $K_p$, $K_i$, $K_d$ are computed for each of the six variation patterns, i.e. pattern Nos. 7 to 12, of the manipulated variable (the turbine vane opening degree TRB_B_u). In other words, in pattern Nos. 7 to 12, six sets of ideal PID gains Kp7, Ki7, Kd7 to Kp12, Ki12, Kd12 exist.

FIG. 5 is a view illustrating the map function Mf_p when designed on the basis of the experiment illustrated in FIG. 4. The position of the ideal PID gain $K_p$ relative to each combination of the inputs (the engine rotation number RT_N and the fuel injection quantity F_INJ_Q) of the map function Mf_p is plotted on FIG. 5 using points. As illustrated in FIG. 5, a plurality of ideal PID gains $K_p$ exist in a dispersed fashion relative to several combinations of the engine rotation number RT_N and the fuel injection quantity F_INJ_Q. In other words, the ideal PID gain $K_p$ is widely dispersed at condition points of the engine rotation number and the fuel injection quantity. In the figure, vertical arrows indicate this dispersion. As a result, the map function cannot output an ideal PID gain corresponding to the status.

First Embodiment

Figure 6:
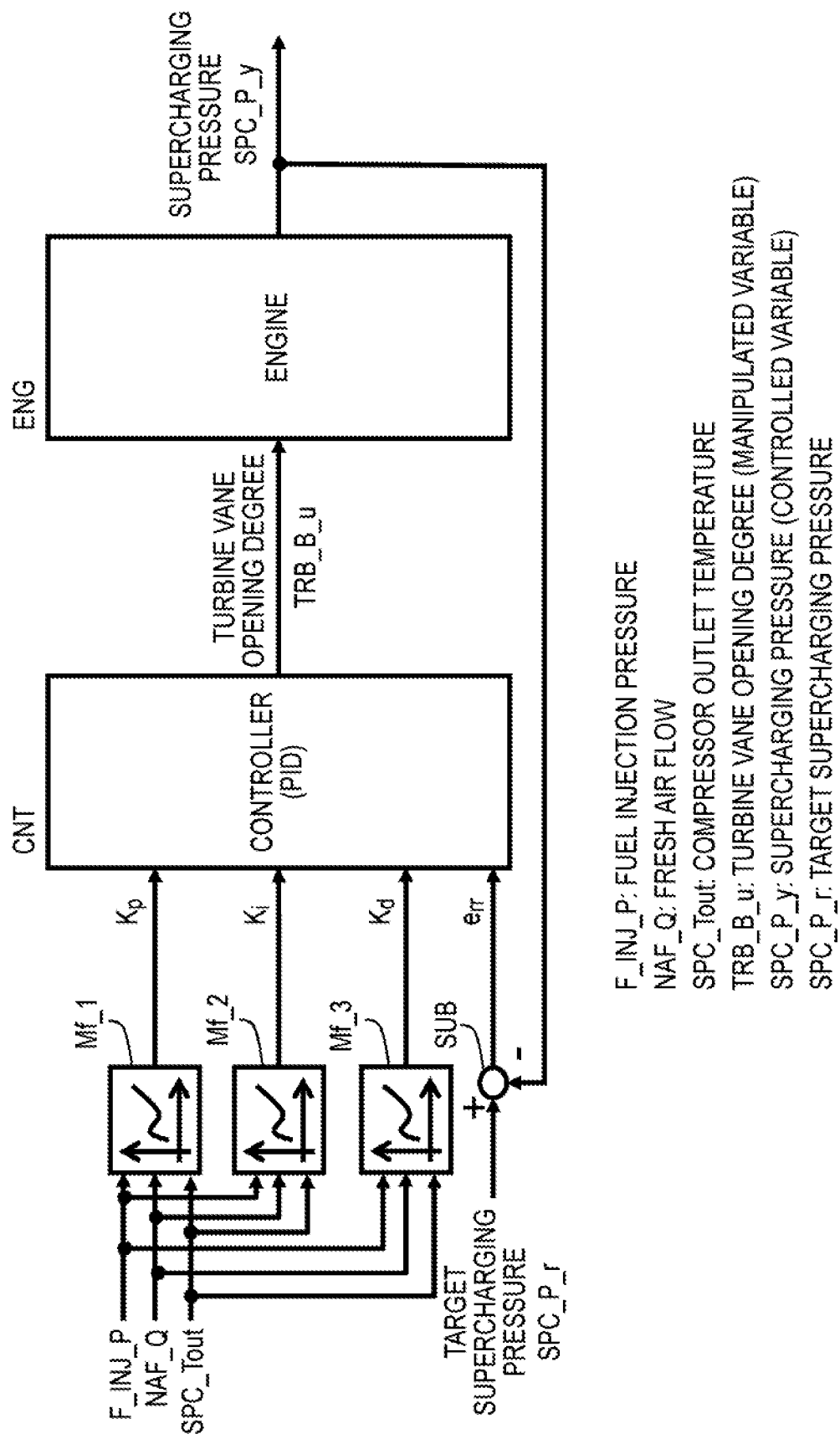
FIG. 6 is a view illustrating an engine intake system control device according to this embodiment, which includes map functions for computing PID gains on the basis of the fresh air flow NAF_Q input into the supercharger, the compressor outlet temperature SPC_Tout of the supercharger, and the fuel injection pressure F_INJ_P of the engine.

FIG. 6 is a view illustrating an engine intake system control device according to this embodiment, which includes map functions for computing PID gains on the basis of the fresh air flow NAF_Q input into the supercharger, the compressor outlet temperature SPC_Tout of the supercharger, and the fuel injection pressure F_INJ_P of the engine.

The engine intake system control device of FIG. 6 includes map functions MF_1, MF_2, MF_3 that respectively inputs the fresh air flow NAF_Q, the compressor outlet temperature SPC_Tout of the supercharger, and the fuel injection pressure F_INJ_P of the engine and output PID gains $K_p$, $K_i$, $K_d$. The engine intake system control device further includes the supercharger controller CNT for computing the turbine vane opening degree TRB_B_u, which is one of the manipulated variables of the intake system of the engine ENG, using, as input, the deviation err between the supercharging pressure SPC_R_y, which is the controlled variable of the intake system of the engine, and the target value SPC_P_r of the supercharging pressure and the PID gains $K_p$, $K_i$, $K_d$, which are the control gains output by the map functions.

For example, the supercharger controller CNT is a PID controller that computes the turbine vane opening degree TRB_B_u that is the manipulated variable with respect to the deviation err on the basis of the PID gains $K_p$, $K_i$, $K_d$ output by the map functions.

As illustrated in FIG. 4, with respect to a plurality of (six, for example) variation patterns of the manipulated variable (the turbine vane opening degree TRB_B_u), the fresh air flow NAF_Q of the supercharger, the compressor outlet temperature SPC_Tout, and the fuel injection pressure F_INJ_P of the engine take six sets of different values, namely M_af1, T_comp1, R_P1 to M_af6, T_comp6, R_P6 and M_af7, T_comp7, R_P7 to M_af12, T_comp12, R_P12.

Hence, the present inventors randomly modified combinations of a plurality of physical quantities of the engine, designed map functions that inputs the respective combinations and output ideal PID gains for the respective variation patterns of the manipulated variable, and evaluated the respective map functions.

As a result, as illustrated in FIG. 6, it was found that when a combination of the fresh air flow NAF_Q of the supercharger, the compressor outlet temperature SPC_Tout, and the fuel injection pressure F_INJ_P of the engine was used as the input of the map functions, the corresponding map functions received the highest evaluation. The evaluation results will be described below.

In this embodiment, the manipulated variable of the supercharger of the engine that is the controlled device is the vane opening degree (the turbine vane opening degree) of a variable nozzle turbine, and the controlled variable is the output air pressure of the compressor, i.e. the supercharging pressure. Further, a combination of the fresh air flow NAF_Q of the supercharger, the compressor outlet temperature SPC_Tout, and the fuel injection pressure F_INJ_P of the engine is employed as the combination of physical quantities that are the input of the map functions. By employing this combination as the factor (the input) of the map functions, the map functions Mf_p, Mf_i, Mf_d can output ideal PID gains that are suitable for the status of the supercharger and correspond to a plurality of variation patterns of the manipulated variable.

The engine intake system control device illustrated in FIG. 6 includes a first map function Mf_1 that computes a proportional gain $K_p$ as a first control gain from information about the fuel injection pressure, the fresh air flow, and the compressor output temperature, a second map function Mf_2 that computes an integral gain $K_i$ as a second control gain from the information about the fuel injection pressure, the fresh air flow, and the compressor output temperature, and a third map function Mf_3 that computes a differential gain $K_d$ as a third control gain from the information about the fuel injection pressure, the fresh air flow, and the compressor output temperature. Each map function is either a three-dimensionally structured map or a map constituted by a combination of a two-dimensional structure and a one-dimensional structure.

Further, the engine intake system control device includes the subtractor SUB for computing the deviation $e_{rr}$ between the target value SPC_P_r of the supercharging pressure and the measured value SPC_P_y of the supercharging pressure both of which are the controlled variable, and the supercharger controller CNT for computing the manipulation quantity of the turbine vane opening degree TRB_B_u from information about the proportional gain $K_p$, the integral gain $K_i$, the differential gain $K_d$, and the deviation $e_{rr}$. The engine intake system control device controls the supercharging pressure SPC_P_y so as to approach the target value by variably controlling the turbine vane opening degree of the supercharger of the engine ENG that is the controlled device.

The fuel injection pressure F_INJ_P of the engine is a physical quantity relating to the exhaust gas pressure of the engine. The fuel injection pressure F_INJ_P may be any of an injection pressure target value, a measurement value acquired by an injection pressure sensor, and an estimated value generated by a prediction model or a software sensor, of a fuel injection system.

The fresh air flow NAF_Q is the flow rate of fresh air newly taken into the engine from the outside air and the amount of air input into the supercharger. The fresh air flow NAF_Q may be either a measurement value acquired by a fresh air flow sensor for measuring the fresh air flow or an estimated value generated by a prediction model or a software sensor.

Further, the compressor output temperature SPC_Tout is the temperature of the compressed air output by the compressor of the supercharger, and may be either a measurement value acquired by a compressor outlet temperature sensor for measuring the temperature on the outlet side of the compressor or an estimated value generated by a prediction model or a software sensor. Furthermore, since the post-compression temperature of the compressor varies according to the atmospheric temperature, the compressor outlet temperature may also be a temperature difference between the compressor outlet temperature and the atmospheric temperature.

The supercharger controller CNT computes the manipulation quantity of the turbine vane opening degree from the information about the proportional gain $K_p$, the integral gain $K_i$, the differential gain $K_d$, and the deviation $e_{rr}$ on the basis of the PID controller CNT. A gain $G_{PID}(s)$ of a PID controller is as indicated in the following expression.

[Math. 1]

$$G_{PID}(s) = K_p + \frac{K_i}{s} + K_d s \quad (1)$$

$$u_{FB}(s) = G_{PID}(s)e_{rr}(s) \quad (2)$$

$$u(s) = u_{FB}(s) + u_{FF}(s) \quad (3)$$

In the above expression, $u_{FB}(s)$ is a manipulated variable of feedback control and $u_{FF}(\ )$ is a manipulated variable of feedforward control. The manipulated variable $u_{FF}(\ )$ of the feedforward control can be determined on the basis of a map function using the engine rotation number and the injection quantity, for example, and can also be determined on the basis of a map function using information about the fuel injection pressure, the fresh air flow, and the compressor outlet temperature.

In the embodiment of FIG. 6, an example using a PID controller is illustrated, but a PI controller, a PID controller, a P-D controller, a PI-D controller, an I-PD controller, and so on may be used.

Figure 7:
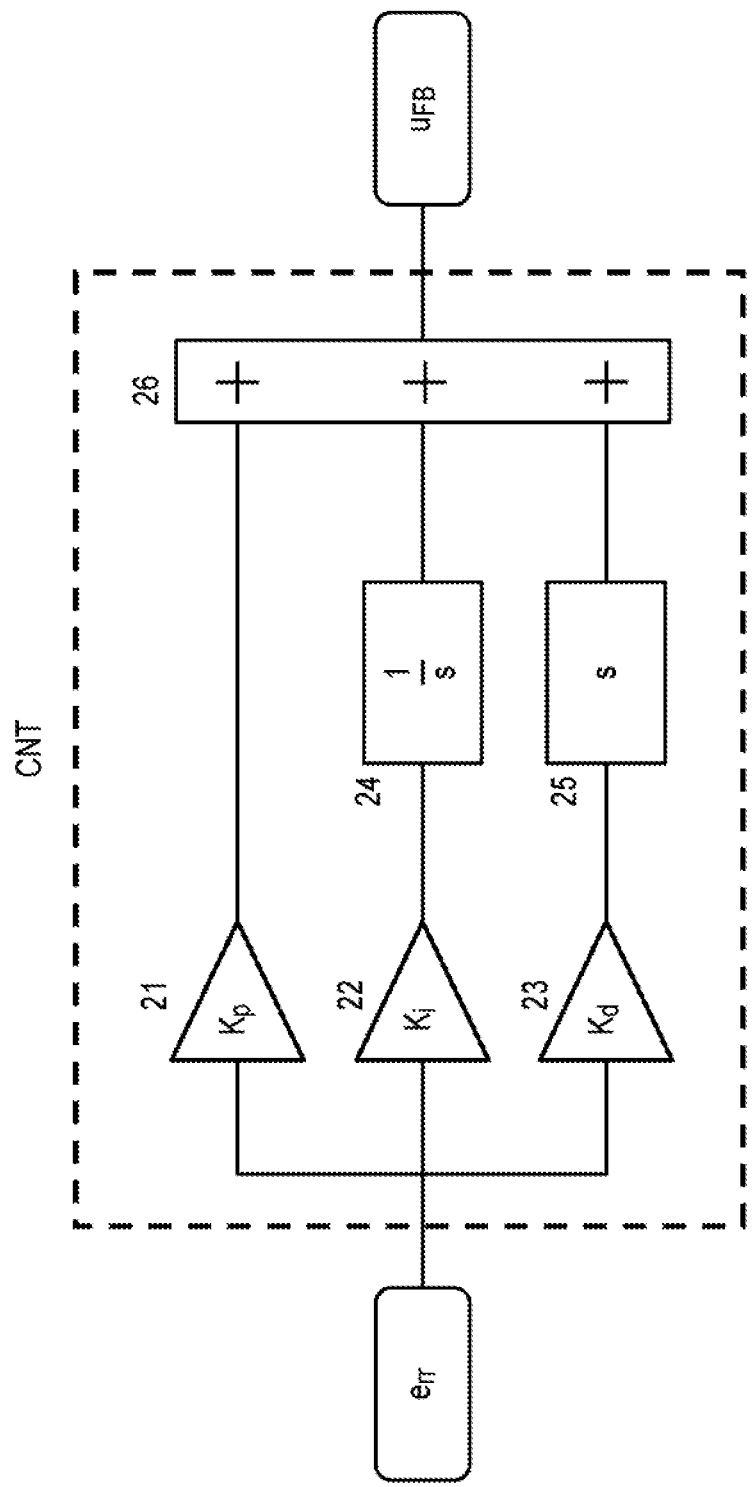
FIG. 7 is a block diagram illustrating the PID controller that is the controller CNT.

FIG. 7 is a block diagram illustrating the PID controller that is the controller CNT. The controller CNT includes multipliers 21, 22, 23 that respectively multiply the proportional gain $K_p$, the integral gain $K_i$, and the differential gain $K_d$ by the deviation $e_{rr}$ between the target value SPC_P_r and the measured value SPC_P_y of the input supercharging pressure, an integrator 24 that determines a time integral, a differentiator 25 that determines a time differential, and an adder 26 that adds together three control values. The controller CNT varies the manipulated variable $u_{FB}$ in proportion to a value acquired by multiplying the deviation $e_{rr}$ between the target value SPC_P_r and the measured value SPC_P_y of the supercharging pressure by the proportional gain $K_p$, varies the manipulated variable $u_{FB}$ in proportion to a value acquired by multiplying the deviation $e_{rr}$ by the integral gain $K_i$, and varies the manipulated variable $u_{FB}$ in proportion to a value acquired by multiplying the deviation $e_{rr}$ by the differential gain $K_d$.

Figure 8:
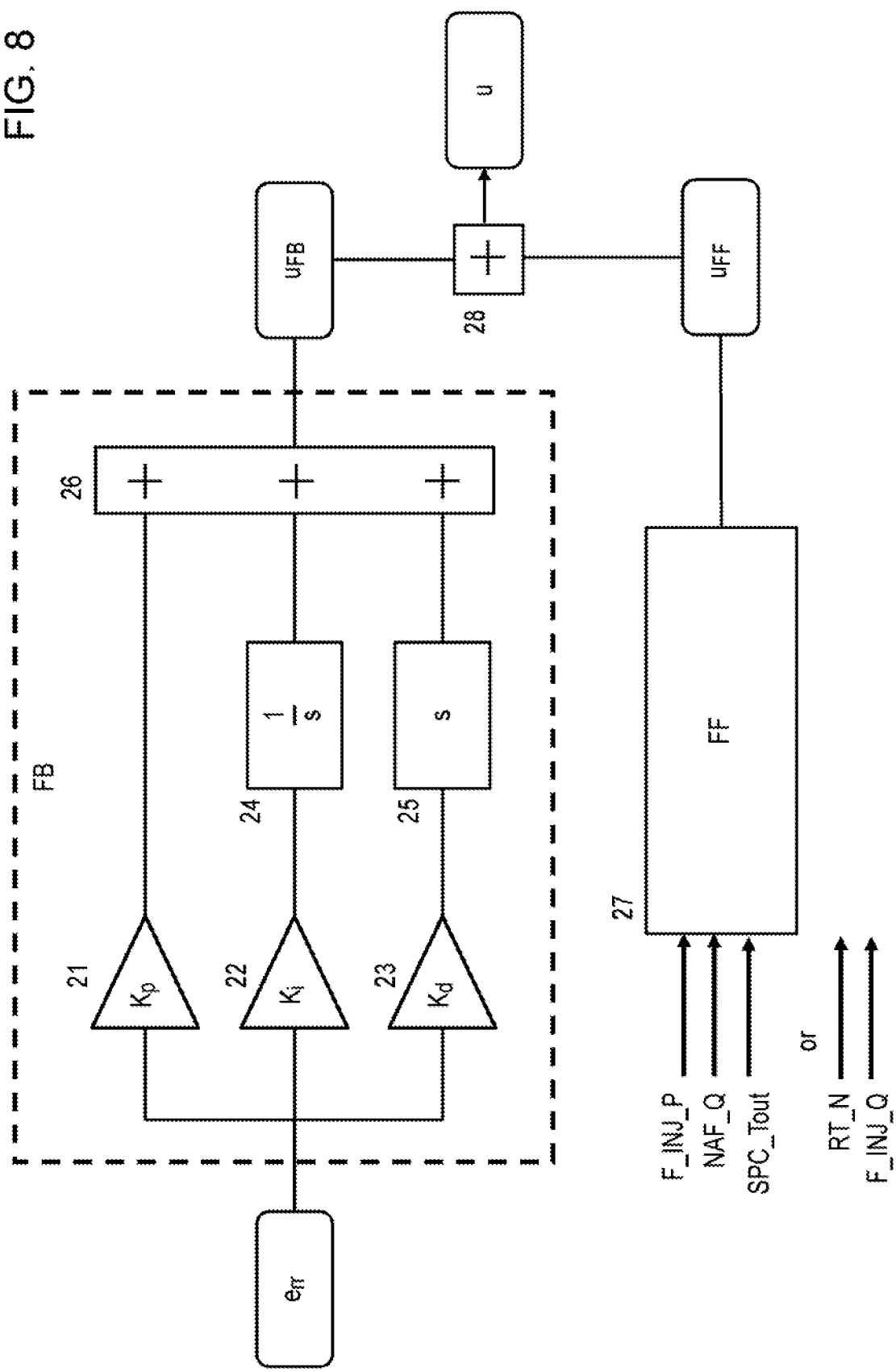
FIG. 8 is another block diagram illustrating the PID controller that is the controller CNT.

FIG. 8 is another block diagram illustrating the PID controller that is the controller CNT. The controller CNT of FIG. 8 includes a feedback control unit FB, a feedforward control unit FF, and an adder 28. The feedback control unit FB is identical to FIG. 7. The feedforward control unit FF is a map function that inputs, for example, the fuel injection pressure F_INJ_P of the engine, the fresh air flow NAF_Q of the supercharger, and the compressor output temperature SPC_Tout, and outputs a feedforward value $u_{FF}$.

The feedforward control unit FF may also be a map function that inputs the engine rotation number RT_N and the fuel injection quantity F_INJ_Q of the engine and outputs the feedforward value $u_{FF}$.

Figure 9:
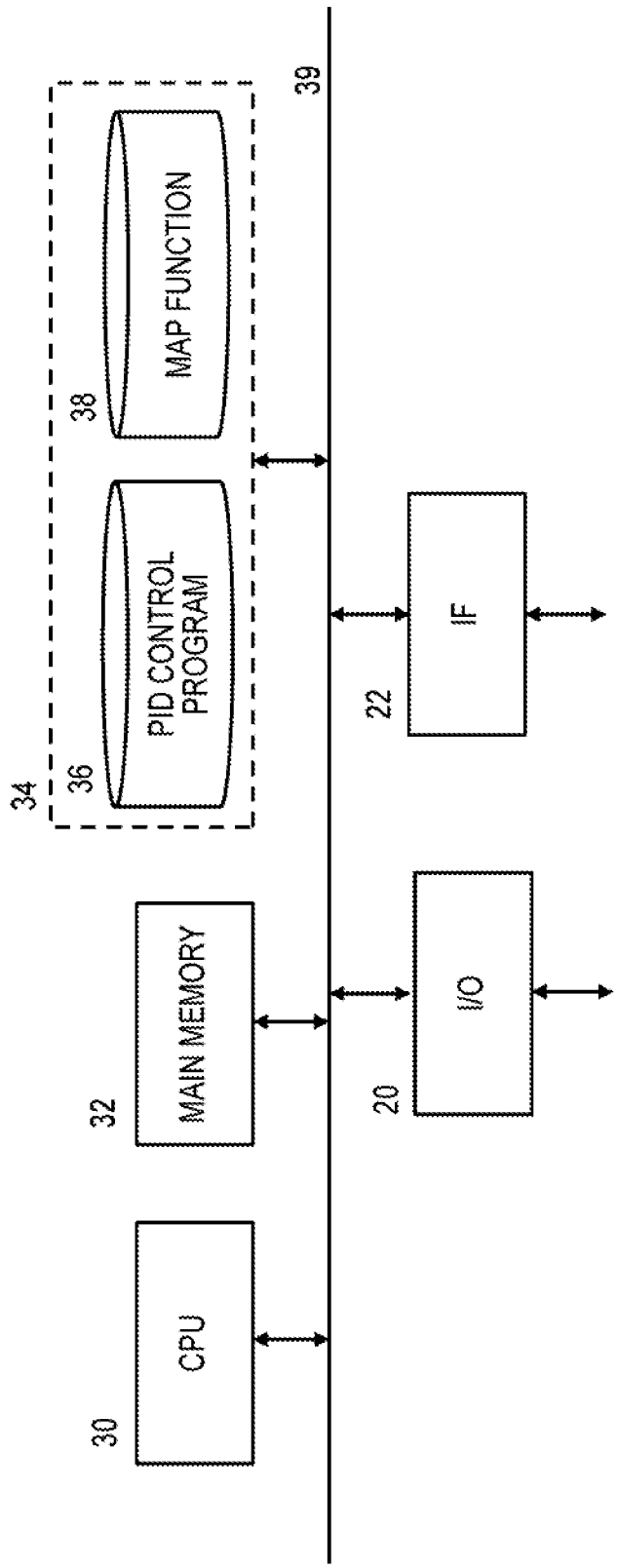
FIG. 9 is a view illustrating an example hardware configuration of the engine intake system control device according to this embodiment.

FIG. 9 is a view illustrating an example hardware configuration of the engine intake system control device according to this embodiment. The engine intake system control device is an electronic control unit (ECU), for example. The ECU includes a processor 30, a main memory 32 that is accessed by the processor, a storage device 34 such as a flash memory, an input/output unit 40 that performs processing for inputting and outputting physical quantities, and an interface unit 22 that is an interface with an in-vehicle network. A PID control program 36 and map functions 38 in a table format, for example, are recorded in the storage device 34.

The processor 30 receives the fresh air flow NAF_Q, the compressor outlet temperature CMP_Tout, and the fuel injection pressure F_INJ_P of the intake system of the engine, generates PID gains that are outputs of the map functions corresponding to the three input values by referring to the map functions 38, and performs the PID control of the controller CNT described above by executing the PID control program 36.

FIG. 10 is a view illustrating comparison results of the reproducibility of the PID gains output by the map functions of the engine intake system control devices illustrated respectively in FIGS. 2 and 6. More specifically, the reproducibility values of the PID gains of the map functions are values indicating the similarity between the PID gains computed by the respective map functions of the engine intake system control devices of FIGS. 2 and 6 and the ideal PID gains, or in other words the degree to which the ideal PID gains can be reproduced. Each reproducibility is an average value of a ratio of the PID gains computed by the map functions in response to the inputs to the ideal PID gains.

FIG. 10 illustrates the sum of two reproducibility values, namely the reproducibility RP1 of the proportional gain and the reproducibility RP2 of the integral gain, for each of the engine intake system control devices of FIGS. 2 and 6.

As described above, with the map functions of FIG. 2, the ideal PID gains relative to a certain combination of the engine rotation number and the fuel injection quantity differ for each the variation pattern of the manipulated variable, and therefore the PID gains relative to a certain combination of the engine rotation number and the fuel injection quantity may be set at an average value of a plurality of ideal PID gains. Accordingly, the reproducibility values RP1, RP2 of the proportional gain and the integral gain computed by the map functions of FIG. 2 are 0.50 and 0.66, respectively, and the sum thereof is 1.16.

With the map functions of FIG. 6, meanwhile, the reproducibility values of the proportional gain and the integral gain computed by the map functions in relation to a certain combination of the fresh air flow, the compressor outlet temperature, and the fuel injection pressure are 0.67 and 0.79, respectively, and the sum thereof is 1.46. Hence, with respect to all of the proportional gain, the integral gain, and the sum of the two gains, the PID gains output by the map functions of FIG. 6 are closer to the ideal PID gains than those of FIG. 2.

The present inventors searched the superior reproducibility of FIG. 6 on different permutations and combinations of three physical quantities among a plurality of physical quantities of the engine. As a result, as illustrated in FIG. 6, it was found that the map functions achieved the highest reproducibility when a combination of the fresh air flow, the compressor outlet temperature, and the fuel injection pressure was used as the input.

Figure 11:
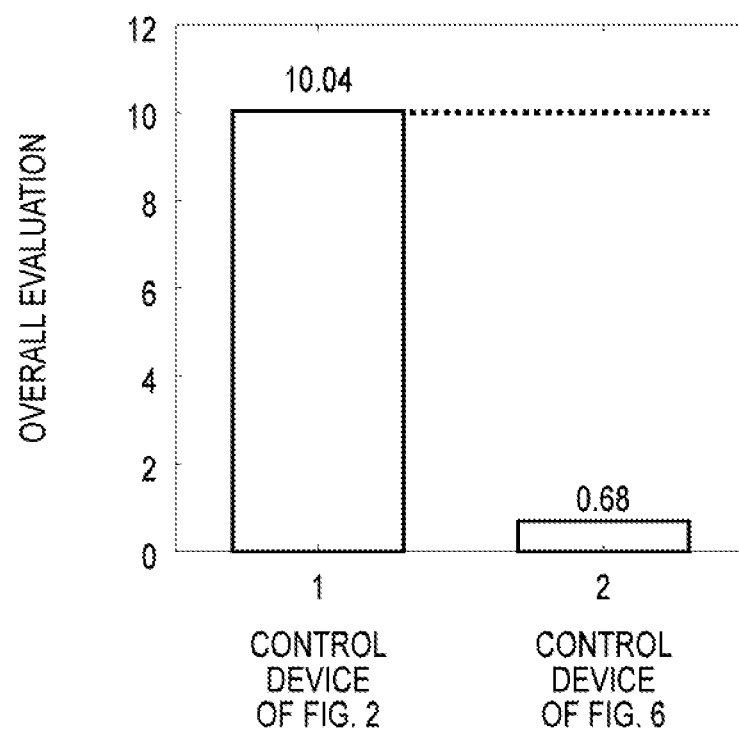
FIG. 11 is a view illustrating a comparison result of evaluation values of the deviation between the controlled variable controlled by each of the engine intake system control devices of FIGS. 2 and 6 and the target value.

FIG. 11 is a view illustrating a comparison result of the deviation, which is evaluation value, between the controlled variable controlled by each of the engine intake system control devices of FIGS. 2 and 6 and the target value. The evaluation value is a value acquired by adding, as a weighting, a time average value, over a predetermined time, of the variation width of the turbine vane opening degree that is the manipulated variable to a time average value, over a predetermined time, of the deviation $e_{rr}$ between the measured value SPC_P_y and the target value SPC_P_r of the supercharging pressure in a plurality of modification patterns of the target value of the controlled variable. This means that as the time average value of the deviation over the predetermined time decreases, the measured value of the controlled variable (the supercharging pressure) becomes steadily closer to the target value thereof. Further, as the time average value of the variation width of the manipulated variable over the predetermined time decreases, the valve opening degree is manipulated in a steadily more desirable manner such that chattering, in which the valve opening degree is operated unnecessarily violently, does not occur. Accordingly, this means that as an overall evaluation, which is acquired by averaging the aforesaid evaluation value over a plurality of modification patterns of the target value, decreases, a steadily more favorable control performance is achieved.

According to FIG. 11, compared with the overall evaluation value of the control device illustrated in FIG. 2, the overall evaluation value of the control device illustrated in FIG. 6 is extremely small.

Note that the evaluation value may also be an average value of an integrated value of the deviation between the measured value SPC_P_y and the target value SPC_P_r of the supercharging pressure of the engine intake system control device over a plurality of modification patterns of the target value.

Figure 12:
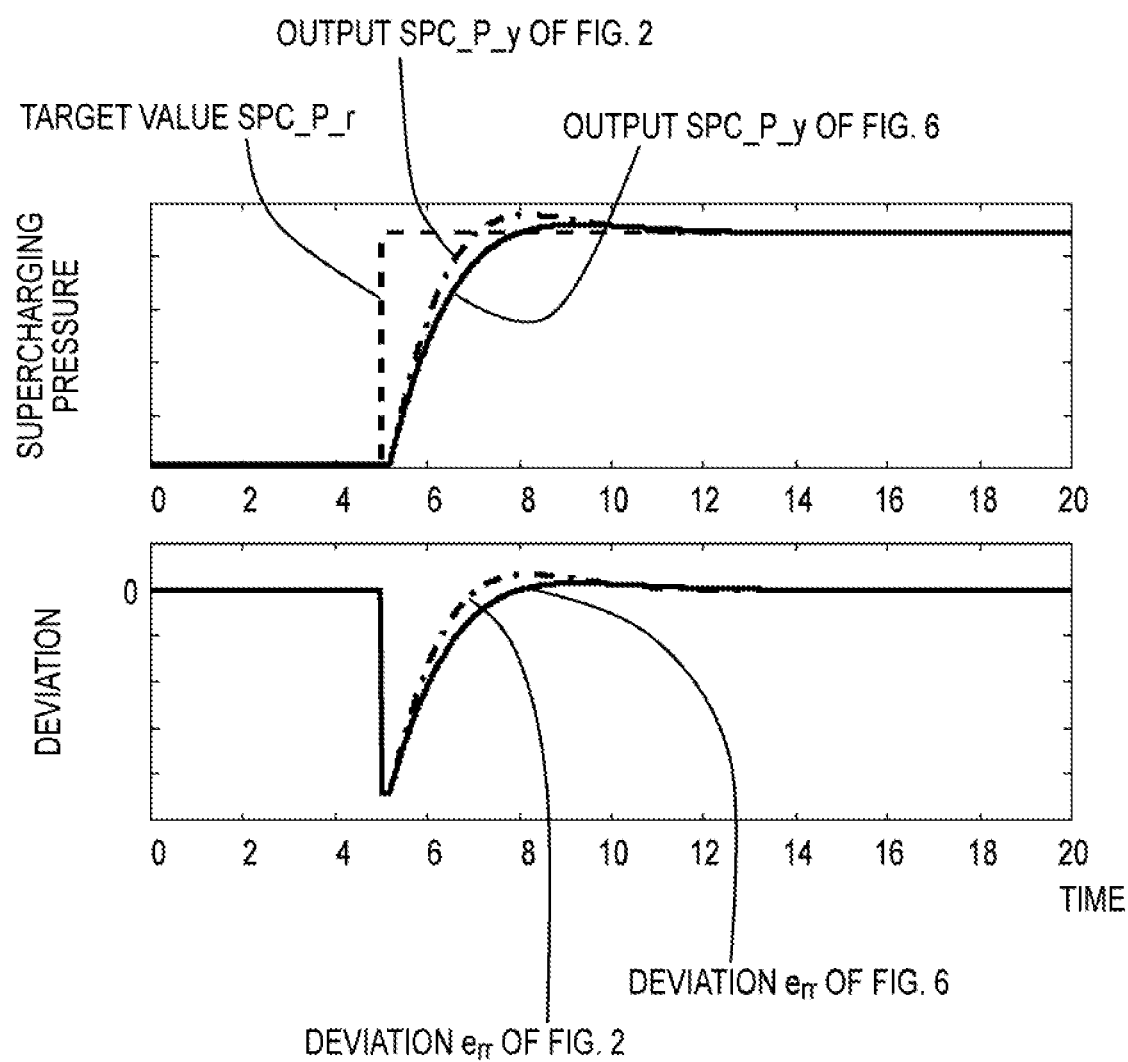
FIG. 12 is a view illustrating examples of variation in the measured value of the controlled variable when the target value of the controlled variable is modified as described with reference to FIG. 11.

FIG. 12 is a view illustrating examples of variation in the measured value of the controlled variable when the target value of the controlled variable is modified as described with reference to FIG. 11. In FIG. 12, with respect to the supercharging pressure, variation in the target value SPC_P_r of the supercharging pressure is indicated by a dotted line, variation in the output SPC_P_y of the supercharging pressure in the control device of FIG. 2 is indicated by a dot-dash line, and variation in the output SPC_P_y of the supercharging pressure in the control device of FIG. 6 is indicated by a solid line. Further, in FIG. 12, with respect to the deviation, variation in the deviation $e_{rr}$ acquired by subtracting the target value SPC_P_r from the output SPC_P_y of the supercharging pressure in the control device of FIG. 2 is indicated by a dot-dash line, and the same deviation $e_{rr}$ in the control device of FIG. 6 is indicated by a solid line.

It is evident from FIG. 12 that the output SPC_P_y follows the target value SPC_P_r more closely, i.e. without overshooting, in the control device of FIG. 6 than in the control device of FIG. 2.

Second Embodiment

In a second embodiment, an internal model controller (an IMC) is used instead of the PID controller of the first embodiment. In the first embodiment, the control gains are PID gains (the proportional gain $K_p$, the integral gain $K_i$, and the differential gain $K_d$), whereas with the internal model controller of the second embodiment, the PID gains are a proportional gain $K_{p:IMC}$, an integral gain $K_{i:IMC}$, and an differential gain $K_{d:IMC}$.

More specifically, in the case of an internal model controller (an IMC), the gain $G_{IMC}(s)$ of the internal model controller, the proportional gain $K_{p:IMC}$, the integral gain $K_{i:IMC}$, and the differential gain $K_{d:IMC}$ are as indicated in the following expression.

[Math. 2]

$$G_{IMC}(s) = K_{p:IMC} + \frac{K_{i:IMC}}{s} + K_{d:IMC} s \quad (4)$$

$$K_{p:IMC} = K_p(\lambda) \quad (5)$$

$$K_{i:IMC} = \frac{K_p(\lambda)}{T_i} \quad (6)$$

$$K_{d:IMC} = K_p(\lambda) T_d \quad (7)$$

Here, $T_i$ is the integration time, $T_d$ is the differentiation time, and X is the time lag (the time from the point at which the target value of the controlled variable is modified to the point at which the controlled variable actually starts to vary). With an internal model controller, $Kp(\lambda)$, the integration time $T_i$, and the differentiation time $T_d$ can respectively be computed by postulating a mathematical model based on the dynamic behavior of the control subject and determining a control law in accordance with the structure of the mathematical model.

MODIFIED EXAMPLES

In the above embodiments, the turbine vane opening degree was employed as the manipulated variable. However, this embodiment can be applied similarly by employing the valve opening degree of the bypass valve BYP_V provided between the exhaust manifold EMF connected to the supercharger SPC and the exhaust passage 2 or the opening degree of an EGR valve, which is a valve provided in an EGR device for recirculating exhaust gas from the exhaust manifold EMF side of the engine cylinders to the intake manifold IMF on the intake side, instead of the turbine vane opening degree. In the engine, the supercharging pressure of the supercharger can be modified likewise by modifying the valve opening degree of the bypass valve BYP_V or the opening degree of the EGR valve.

Further, the engine rotation number and the fuel injection quantity can be used as the input of the map functions in addition to the fresh air flow, the compressor outlet temperature, and the fuel injection pressure.

Furthermore, the engine is an internal combustion engine having a supercharger, therefore this embodiment can be applied to either a gasoline engine or a diesel engine.

According to this embodiment, as described above, in a gain scheduling control device for an intake system of an engine, map functions compute PID gains from the fresh air flow of the engine, the compressor outlet temperature of the supercharger, and the fuel injection pressure of the engine, and a controller computes a manipulated variable on the basis of the PID gains and a deviation between a target value and a measured value of a controlled variable. Thus, the PID gains computed by the map functions can be brought closer to ideal PID gains, and as a result, highly precise control can be implemented on the supercharging pressure, i.e. the pressure of the air output by the supercharger, with little overshooting or undershooting relative to the target value of the supercharging pressure. According to the embodiment, PID gains can be generated for different statuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An engine intake system control device configured to control an intake system of an engine, comprising:
   a map function configured to input at least a fuel injection pressure of the engine, a fresh air flow, and a compressor outlet temperature of a supercharger, and output a control gain, the control gain including at least one of a proportional gain, an integral gain and a differential gain, and the map function including a map that includes a plurality of control gains corresponding to a plurality of combinations of the fuel injection pressure of the engine, the fresh air flow, and the compressor outlet temperature of a supercharger respectively; and
   a controller configured to input the control gain and a deviation between a controlled variable of the intake system of the engine and a target value of the intake system, and variably control a manipulated variable of the intake system of the engine in proportion to at least one of a first value which the controller multiplies the deviation by the proportional gain to obtain, a second value which the controller multiplies the deviation by the integral gain to obtain, and a third value which the controller multiplies the deviation by the differential gain to obtain.

2. The engine intake system control device according to claim 1, wherein the controlled variable is a supercharging pressure of air flow output by a compressor of the supercharger, and
   the manipulated variable is any of a turbine vane opening degree of a turbine of the supercharger of the engine, a valve opening degree in a bypass passage of the turbine of the supercharger, and a valve opening degree of an exhaust gas recirculation device.

3. The engine intake system control device according to claim 1, wherein the control unit is a PID controller, and the control gain is PID gains including the proportional gain, the integral gain, and the differential gain.

4. The engine intake system control device according to claim 2, wherein the control unit is a PID controller, and the control gain is PID gains including the proportional gain, the integral gain, and the differential gain.

5. The engine intake system control device according to claim 1, wherein the control unit is an internal model controller.

6. The engine intake system control device according to claim 2, wherein the control unit is an internal model controller.

7. The engine intake system control device according to claim 1, wherein the compressor outlet temperature is a temperature difference relative to the atmospheric temperature.

8. The engine intake system control device according to claim 2, wherein the compressor outlet temperature is a temperature difference relative to the atmospheric temperature.

9. The engine intake system control device according to claim 1, wherein the fuel injection pressure is either a measured value of the fuel injection pressure of the engine or a target value of the fuel injection pressure.

10. The engine intake system control device according to claim 2, wherein the fuel injection pressure is either a measured value of the fuel injection pressure of the engine or a target value of the fuel injection pressure.

11. The engine intake system control device according to claim 1, wherein the map function also inputs an engine rotation number and a fuel injection quantity.

12. The engine intake system control device according to claim 2, wherein the map function also inputs an engine rotation number and a fuel injection quantity.

13. An engine intake system control method for controlling an intake system of an engine, the method including processing for:
  inputting at least a fuel injection pressure of the engine, a fresh air flow, and a compressor outlet temperature of a supercharger, and outputting a control gain by referring to a map function, the control gain including at least one of a proportional gain, an integral gain and a differential gain, and the map function including a map that includes a plurality of control gains corresponding to a plurality of combinations of the fuel injection pressure of the engine, the fresh air flow, and the compressor outlet temperature of a supercharger respectively; and
  inputting the control gain and a deviation between a controlled variable of the intake system of the engine and a target value thereof, executing at least one of multiplying the deviation by the proportional gain to obtain a first value, multiplying the deviation by the integral gain to obtain a second value, and multiplying the deviation by the differential gain to obtain a third value, and variably controlling a manipulated variable of the intake system of the engine in proportion to at least one of the first value, the second value, and the third value.

* * * * *